United States Patent Office 3,530,107
Patented Sept. 22, 1970

3,530,107
MODIFIED CATALYST SYSTEM AND PROCESS FOR PRODUCTION OF POLYMERS OF 1-OLEFINS
Shiro Yoshioka, Kimio Kurashima, and Yozo Kinoshita, Nagoya, Japan, assignors to Mitsui Toatsu Chemicals, Inc., Tokyo, Japan, a corporation of Japan
No Drawing. Continuation-in-part of application Ser. No. 408,680, Nov. 3, 1964. This application Nov. 6, 1968, Ser. No. 773,938
Int. Cl. C08f 15/04
U.S. Cl. 260—878         13 Claims

ABSTRACT OF THE DISCLOSURE

A catalyst system and a process for producing homopolymers of propylene and copolymers of propylene and other 1-olefins, said catalyst system comprising a titanium trichloride component, a dialkyl aluminum monohalide and an organic compound selected from organic monoether compounds and monoketone compounds, the titanium trichloride component and organic compound being present in the form of copulverised and agglomerated granular particles, more than 80% by weight of said granular particles having a diameter ranging from 10 to 105 microns.

---

This application is a continuation-in-part of our application Ser. No. 408,680 filed on Nov. 3, 1964 which has been abandoned at the time of filing this application.

This invention relates to a process for homopolymerising and copolymerising low molecular weight olefins to solid crystalline homopolymers and copolymers, and to a novel catalyst system for said homopolymerisation and copolymerisation. More particularly, this invention relates to a titanium trichloride composition of catalyst system having very narrow particle size distribution, and to a process for producing a homopolymer, a copolymer and a heteroblock copolymer of propylene having very narrow particle size distribution, and very high crystallinity and excellent physical and mechanical properties by use of said catalyst system.

It has been known that the most suitable catalyst system in use for the production of highly crystalline polymers of 1-olefins is one comprising an organoaluminum compound and violet titanium trichloride prepared by reducing titanium tetrachloride with a metal of Group II or III of the periodic table and activating the resulting titanium trichloride by milling or grinding. Use of titanium tertachloride as a catalyst component is effective for the polymerisation of ethylene, but it is not a suitable catalyst component for the polymerisation of 1-olefins, because titanium tetrachloride produces only polymers of a low crystallinity.

There have htitherto been known several processes for preparing titanium trichloride by reducing titanium tetrachloride with hydrogen, metals or organometallic compounds. Among products prepared by these processes, titanium trichloride obtained by reduction with a metal, especially aluminum has the most excellent activity as a catalyst component. Titanium trichloride obtained by reduction with hydrogen has a defect of a low polymerisation activity, and titanium trichloride obtained by reduction with an organometallic compound has a drawback that the resulting polymers are of a low crystallinity and of a broad molecular weight distribution. Accordingly, as one component of the catalyst system for the polymerisation of 1-olefins the most preferable is the titanium trichloride component which is obtained by reducing titanium tetrachloride with aluminum metal and activating the reduced product by pulverizing. The catalyst has a composition almost corresponding to $3TiCl_3 \cdot AlCl_3$, said titanium trichloride being broadly used in the art of the production of polymers of 1-olefins.

The organoaluminum compound used as another catalyst component includes various compounds which are classified into four groups; (1) a group of compounds represented by $AlR_3$ (such as trialkyl aluminum and triaryl aluminum compounds), (2) a group of compounds represented by $R_2AlX$ (such as dialkyl aluminum monochlorides), (3) a group of compounds represented by $R_3Al_2X_3$ (such as alkyl aluminum sesquichlorides), and (4) a group of compounds represented by $RAlX_2$ (such as monoalkyl aluminum chlorides).

Compounds of the $R_2AlX$ type are the most suitable as the organoaluminum compound component of the catalyst for the polymerisation of 1-olefins. Compounds of the $AlR_3$ type produce only polymers having fatal defects of a low crystallinity and a broad molecular weight distribution, though they exhibit the highest polymerisation activity. Use of compounds of the $R_3Al_2X_3$ or $RAlX_2$ type as an organoaluminum compound component is also disadvantageous, because catalyst systems comprising said compounds exhibit only a low activity. Thus, improvements of their catalytic activity by incorporating in these compounds a nitrogen- or oxygen-containing compound or other compound have been proposed. However, catalyst systems in accordance with these proposals are still inferior in respect of catalytic activity to those comprising compounds of the $AlR_3$ or $R_2AlX$ type as the organoaluminum component. Accordingly, use of compounds of the $R_2AlX$ is most desirable, and catalyst systems comprising a titanium trichloride component obtained by reducing titanium tetrachloride with aluminum metal and activating the reduced product by pulverising, and an organoaluminum compound of the $R_2AlX$ type are broadly used for the polymerisation of 1-olefins.

Howevr, these known catalyst systems have many industrial drawbacks.

First of all, when propylene is industrially homopolymerised, copolymerised or heteroblock copolymerised by using any of these known catalytic systems by the conventional method, it is inevitable to have a considerable amount of an easily solvent-soluble polymer or copolymer which is poor in crystallinity, in addition to the formation of 70 to 90% of a crystalline polymer or copolymer based on the monomers reacted. Such amorphous homopolymer or copolymer is generally called an atactic polymer. The atactic polymer has remarkably low commercial value as compared with a crystalline homopolymer or copolymer. Moreover, if a great quantity (for instance, more than 5%) of atactic polymer is contained in a crystalline polymer or copolymer, excellent physical and mechanical properties characteristic of a crystalline polymer or copolymer are impaired greatly. Therefore, in the industrial production of propylene homopolymer or copolymer by the conventional method, the reduction of the amount of by-produced atactic polymer has constituted an industrially important problem.

In the second place, in the industrial manufacture of a propylene homopolymer or copolymer, the controlling of the shape of homopolymer or copolymer particles and their particle size distribution constitutes a more important problem.

By the conventional method in which titanium trichloride or a composition of other metal halide with titanium trichloride as the main component is ball milled, the pulverised particles obtained have a wide range of size distribution and usually contain more than 10% of fine particles having a size smaller than 5 microns.

In the homopolymerisation or copolymerisation of propylene carried out in the presence of a composite catalytic system comprising titanium trichloride and an organometallic compound, the particle size of resulting homopolymer or copolymer is markedly influenced by the size of titanium trichloride used. As titanium trichloride or a composition mainly consisting of it which is pulverised by the conventional method has a broad particle size distribution, propylene homopolymers or copolymers produced by conventional method have a wide particle size distribution, the particle diameter ranging from several microns to 5 or 6 millimeters. Furthermore, the shapes of the particles of the obtained polymer are very irregular, and it contains many flat, coarse particles. Powders having such irregular particle shape and a wide particle diameter distribution or slurry or suspension containing such powders give many difficulties in the industrial treatment or processing.

These difficulties involved in the industrial treatment or processing of polyolefins obtained by employing the conventional catalyst systems, and having a wide particle size distribution and containing many fine particles and many flat coarse particles, are detailed hereinbelow:

(1) *Difficulty involved in centrifugal separation of polymer slurries.*—In case polymer particles are continuously and centrifugally separated from a slurry of polyolefin containing many fine particles in a non-polar solvent, a complete separation cannot be expected because the sedimentation rate of fine particles is low. Accordingly, an operational loss of the polymer is increased in the separation step, and hence, the manufacturing yield is reduced.

(2) *Difficulty involved in filtration of polymer slurries.*—In case polymer particles are separated by filtration from a slurry of polyolefin containing many fine particles in a non-polar solvent, fine particles are deposited in a filtering machine and meshes thereof are clogged with deposited particles, with the consequence that the filtration rate is lowered.

(3) *Difficulty involved in drying operation.*—In case polyolefin containing many fine particles is dried by passing an inert gas through the polymer at an elevated temperature, the fine particles come out from a drier accompanying the inert gas, and it is difficult to separate these fine particles from the inert gas because they have a very fine particle size. Consequently, an operational loss in the drying step is increased, and when the inert gas containing such fine particles is used repeatedly by recyclization, there frequently occur various troubles in the drier.

(4) *Difficulty involved in handling.*—In case dried polymer particles are pneumatically transported by employing an inert gas, the particles accompany the inert gas, and it is difficult to separate the particles from the inert gas. Further, since polyolefin containing many fine particles is inferior in respect of fluidity, these fine particles tend to form bridges in a transporting apparatus.

(5) *Difficulty involved in mixing.*—In case polyolefin particles containing many flat particles are blended in a mixing silo by blowing an inert gas from the bottom of the silo, the flat particles are separated from other particles during the mixing operation and they sink into the lower portion of the mixing silo. Thus, the blending becomes difficult. However, such trouble is not caused to occur in the case of coarse particles free of such flat particles.

As described above, the particle size distribution and particle shape of polyolefin are very important factors in the industrial production of polyolefins.

It has been known that when a catalyst system comprising a titanium trichloride component and a dialkyl aluminum component is used for the polymerisation of 1-olefins, the shape and size distribution of the resulting polymer particles are exclusively decided by the shape and size distribution of the titanium trichloride particles to be used.

In order to heighten the polymerisation activity of the catalyst, it is necessary to pulverise the titanium trichloride component. By this pulverising operation, particles of the titanium trichloride component are destroyed and come to have a wide particle size distribution and to contain many particles of undesired sizes. Accordingly, in the conventional art it is impossible to improve both the catalytic activity and particle size of the catalyst at the same time.

For the purpose of improving polymerisation activity, there have been proposed methods of incorporating in a catalyst of the Ziegler-Natta series compounds containing nitrogen, oxygen, sulphur and/or phosphorus. These methods, however, cannot improve the particle size in either the catalyst or the resulting polymer, though the polymerisation activity of the catalyst may be improved to some extent. One of these prior arts teaches that an activity of a catalyst of the Ziegler series can be improved when an oxygen-containing compound such as alcohols is incorporated in the catalyst by milling or grinding said oxygen-containing compound with the catalyst or with one catalyst component, i.e., a polyvalent metal compound such as titanium tetrachloride, zirconium tetrachloride and chromium chloride. However, the particle size of either the catalyst or the resulting polymer cannot be improved by milling or grinding of an oxygen-containing compound with such polyvalent metal compound.

We have found that the particle size distribution of the titanium trichloride composition can be controlled within such a narrow range as more than 80% by weight, preferably more than 90% by weight of the particles consists of particles having a size ranging from 10 to 105 microns, by seelcting especially as titanium component violet crystalline titanium trichloride or violet crystalline titanium trichloride cocrystallized with aluminum trichloride among various titanium halides and co-treating said titanium trichloride component and a specific oxygen-containing compound, namely, an organic monoether or monoketone in a ball mill or vibration mill for 20 and 50 hours to copulverise them and coincidentally agglomerate the once formed finely pulverised particles having a diameter less than 10 microns.

It has also been found that when the so prepared granular particles are used in combination with a dialkyl aluminum monohalide for the homopolymerisation of propylene or the compolymerisation of propylene with a different 1-olefin, there can be obtained polymers in the form of granular particles more than 80% by weight (occasionally more than 90% by weight) of which consist of particles having a diameter ranging from 60 to 1000 microns and whose atactic polymer contents are remarkably low, and that more than 77% by weight of such polymers consists of particles having a diameter ranging from 200 to 1000 microns.

The term "titanium trichloride component" used herein includes violet crystalline titanium trichloride and violet crystalline titanium trichloride cocrystallized with aluminum trichloride.

The term "titanium trichloride composition" used herein means a composition consisting of said titanium trichloride component and an organic compound selected from the group consisting of monoether compounds and monoketone compounds.

Accordingly, an object of this invention is to provide a titanium trichloride composition whose particle size distribution is very narrow whereby the particle shape and particle diameter distribution of the homopolymer or copolymer obtained by using said composition as a component of catalyst system are within a sharply restricted range. Another object of this invention is to provide a catalyst system capable of reducing remarkably an amount of an atactic polymer. Still another object of this invention is to provide a titanium trichloride composition having a narrow range of particle size distribution by nodulizing fine particles formed during the attrition of catalyst, without restoring to such an operation as classification and without damaging the catalytic activity.

Still another object of this invention is to provide a process for producing a homopolymer, a copolymer and a heteroblock copolymer of propylene using such catalyst system, eliminating the defects of the conventional method.

The above mentioned objects can be achieved in accordance with this invention by use of a catalyst composition for the homopolymerisation of propylene and the copolymerisation of propylene with a different 1-olefin having 2-6 carbon atoms, which comprises a titanium trichloride component selected from the group consisting of violet crystalline titanium trichloride and violet crylstalline titanium trichloride cocrystallized with aluminum trichloride, a dialkyl aluminum monohalide and an organic compound selected from the group consisting of organic monoether compounds and organic monoketone compounds, wherein said organic compound is present in an amount of 0.2 to 7 moles per kilogram of the said titanium trichloride component, said titanium trichloride component and said organic compound being present in the form of granular particles obtained by cotreating said titanium trichloride component and said organic compound in a ball mill or vibration mill for 20 to 50 hours to copulverse them and agglomerate the finely pulverised particles, wherein more than 80% by weight of the said granular particles consists of particles having a particle diameter ranging from 10 to 105 microns.

The violet crystalline titanium trichloride or violet crystalline titanium trichloride containing aluminum chloride crystallised simultaneously in the lattice structure referred to this invention is a violet crystalline reaction product prepared by reduction of titanium tetrachloride with hydrogen or with a metal of Group II and III of the Periodic Table such as titanium and aluminum in the presence or absence of hydrochloric acid or aluminum chloride. Particularly suitable as a material for this invention is a titanium trichloride containing aluminum trichloride represented by the formula $3TiCl_3 \cdot AlCl_3$ which is obtained by reducing titanium tetrachloride with metallic aluminum in the presence of hydrochloric acid or aluminum chloride.

The organic monoether compound is an organic compound having one ether-bond in the molecule, and particularly preferable among such compounds in an organic monoether compound represented by the formula: $R_1$—O—$R_2$ (wherein $R_1$ and $R_2$ are selected from alkyl group and aryl group).

Typical organic monoethers are diethylether, di-n-propylether disobutylether, di-n-butylether and diphenylether. These are used alone or in combination.

Among the compounds exemplified above, di-n-butylether and di-phenylether are particularly advantageously used.

By the term organic monoketone compound used in this invention is meant an organic compound having one ketone group. Especially an organic monoketone compound represented by the formula: $R_3$—CO—$R_4$ (wherein $R_3$ and $R_4$ are selected from the alkyl group and aryl group) is preferable.

Typical examples are methylethylketone, methylisobutylketone, diethylketone, acetophenone, diphenylketone, etc. The alkyl group represented by $R_3$ and/or $R_4$ has preferably 1 to 6 carbon atoms, and the aryl group represented by $R_3$ and/or $R_4$ is preferably phenyl group. The most excellent effects are obtained when $R_3$ denotes a methyl group i.e., when the compound is methylethylketone, methypropylketone, methylisobutylketone, or methyl-n-amylketone.

The prominent feature of this invention resides in milling violet crystalline titanium trichloride or violet crystalline titanium trichloride containing aluminum trichloride cocrystallized therewith in the presence of an organic monoether or an organic monoketone in a ball mill or vibration mill. By this milling once formed finely divided particles are strongly agglomerated, and thus the particle size distribution can be controlled within the above described narrow range. This effect results from an intrinsic combination of the above described specific titanium trichloride component with an organic monoether or an organic monoketone. This effect of agglomerating finely divided titanium trichloride cannot be attained by a combination of titanium trichloride with other oxygen- or nitrogen-containing organic compound such as alcohols, aldehydes, carboxylic acids or amines. Thus, any improvement of the particle size distribution cannot be expected from such combination.

Further, even when an organic monoether or an organic monoketone is added to a catalyst system comprising titanium trichloride component and organoaluminum component and they are copulverized by milling, it is impossible to improve the particle size distribution in either the catalyst or the resulting polymer.

In accordance with this invention, said violet crystalline titanium trichloride or violet crystalline titanium trichloride containing aluminum chloride cocrystallized in the lattice structure, and said organic monoether or organic ketone compound are pulverised under highly deaerated conditions or in an atmosphere of an inert gas such as nitrogen or argon by means of a pulverizer usually used in production of fine particle powder. The temperture at the time of pulverization is particularly preferably less than 80° C., and it is necessary to carry it out in a dry condition. As such pulverizer, there are used, for instance, a ball mill, a vibrational mill, a ring mill and an impact pulverising machine.

The milling should be conducted under such conditions that the finely divided titanium trichloride composition will be sufficiently agglomerated. From this standpoint the milling should be conducted for 20 to 50 hours. Although no critical restriction is given to the milling temperature, it is recommended to conduct the milling at temperatures ranging from 0° C to 80° C.

The said organic compound may be added usually before the pulverising operation but it may also be added during the pulverisation. In the latter case, it is necessary to carry out the pulverising operation thoroughly after the addition. The amount of the organic monoether compound or organic monoketone compound to be added to the titanium trichloride component varies according to every individual compound, but generally it is preferable to bring the amount of addition to 0.2 to 7 moles per kilogram of titanium trichloride component. Particularly preferable amount is from 0.2 to 2 moles.

In accordance with this invention, the particle size distribution of the titanium trichloride composition is further improved by pulverising a mixture of three components comprising titanium trichloride component, said organic monoether compound or organic monoketone compound and titanium tetrachloride. The amount of the titanium tetrachloride is usually less than 10% by weight based on the titanium trichloride component, and usually it is in the range of 0.5 to 4% by weight.

This invention can improve the particle size distribution of a titanium trichloride composition used here as a component of catalyst system by said pulverisation, and by using the said titanium trichloride composition, the shape and the size distribution of the particles of a homopolymer or copolymer can be improved. The titanium trichloride catalyst composition of the present invention is in the form of granular particles, and more than 80% by weight, preferably more than 90% by weight of said granular particles consists of particles having a diameter ranging from 10 to 105 microns. This titanium trichloride composition usually contains finely divided particles having a diameter less than 10 microns only in such a low amount as below 12.3% by weight. It is also possible to narrow further the size distribution of the particles of a homopolymer or copolymer by classification of titanium trichloride composition of this invention. For instance, the titanium trichloride composition obtained by pulverisation in accordance with this invention is divided into two parts, one of which has a particle size larger than 50 microns and the other of which has a size smaller than 50 microns by classification in an atmosphere of an inert gas by means of a sieve, gravitional precipitation, and a cyclone. The absence of very fine particles having a size smaller than 5 microns in the part of particles having a size of smaller than 50 microns is a characteristic feature of this invention. The homopolymer or copolymer obtained by using such composition has about 90% of sandy particles whose diameters are in the range of 50 to 1,000 microns, and has a small content of fine particles having a size smaller than 50 microns, without any content of coarse flat particles. If the pulverisation (of titanium trichloride) in accordance with this invention is repeated by addition of part of coarse particles classified as having a diameter larger than 50 microns, it is possible to obtain a titanium trichloride composition substantially free from a portion of particles smaller than 5 microns and consequently to obtain a homopolymer, copolymer or heteroblock copolymer having very narrow particle size distribution. Practically all the particles turn to sandy particles with a size in the range of 50 to 1,000 microns. The conventional method has not been able to achieve such improvement of the shape and size distribution of the particles. By eliminating coarse particles and very fine particles from the titanium trichloride obtained by means of the conventional method, it is also possible to improve the size distribution of the particles of a polymer, but the particle shape is not improved. Furthermore, in the conventional method, the separated and classified titanium trichloride in the form of fine particles cannot be used again because of its minute particle size, and it is very disadvantageous commercially. In accordance with this invention, coarse particles of the titanium trichloride composition can be pulverised to fine particles and at the same time fine particles are agglomerated together to make masses having a suitable particle size. Further, since it is possible, if necessary, to separate the finely divided particles having a diameter less than 10 microns and contained in the titanium trichloride composition in a small amount and to convert them finally into particles having a diameter ranging from 10 to 105 microns, in this invention all of the titanium chloride component is not thrown away but utilized completely. Thus, the size distribution of the particles of the titanium trichloride composition is adjusted to a narrow range.

Furthermore, in accordance with the process of producing a homopolymer or copolymer of this invention using the said titanium trichloride catalyst composition as a catalytic component of the catalyst system, not only the size distribution of the particles of the resulting homopolymer or copolymer is markedly improved, but also the amount of a non-crystalline polymer or copolymer can be sharply reduced.

The process for the homopolymerisation of propylene and the copolymerisation of propylene with a different 1-olefin having 2–6 carbon atoms comprises contacting propylene or mixtures of propylene and said different 1-olefin in the presence of an inert solvent with the catalyst composition comprising a titanium trichloride component selected from the group consisting of violet crystalline titanium trichloride and violet crystalline titanium trichloride cocrystallized with aluminum trichloride, a dialkyl aluminum monohalide and an organic compound selected from the group consisting of organic monoether compounds and organic monoketone compounds, said organic compound being present in an amount of 0.2 to 7 moles per kilogram of the said titanium component, said titanium trichloride component and said organic compound being present in the form of granular particles obtained by cotreating said titanium trichloride component and said organic compound in a ball mill or vibration mill for 20 to 50 hours to copulverise them and agglomerate the finely pulverised particles, wherein more than 80% by weight of the said granular particles consists of particles having a particle diameter ranging from 10 to 105 microns.

The dialkylaluminum monohalide, which is one of the catalytic components of this invention, is dialkylaluminum monohalide in which an alkyl group has less than 5 carbon atoms, and the halogen atom is either chlorine or bromine, and a mixture of dialkylaluminum monohalides above mentioned can be used.

As such compound there are preferably used diethylaluminum monochloride, diethylaluminum monobromide, di-n-propylaluminum monochloride, di-iso-butylaluminum monochloride, etc.

By the term of "1-olefin other than propylene" as used in this invention are meant those olefins having from 2 to 6 carbon atoms, the examples of which are ethylene, n-butene-1, n-pentene-1, n-hexene-1, etc. Among these 1-olefins, especially ethylene or n-butene-1 is advantageously used as one component of a copolymer.

The homopolymerisation or copolymerisation in accordance with this invention can be advantageously carried out in the presence of such inert solvent as n-heptane at a temperature in the range of 0 to 100° C. and at a pressure of less than 30 atmospheres. In this reaction, the molecular weight can be controlled by means of the known methods such as by use of hydrogen.

When the process of this invention is applied to the manufacture of a heteroblock copolymer comprising propylene and ethylene or other 1-olefin, it can be carried out by polymerising these monomers or mixtures of these, one after another.

A heteroblock copolymer can be generally obtained by polymerising a certain monomer, and thereafter continuing the polymerisation upon substitution of this monomer by other kind of monomer whereby a polymer chain comprising one monomer is bound to a polymer chain comprising other monomer. When one monomer is replaced by another monomer, the monomer present prior to replacement is usually removed. In accordance with this invention, the polymerisation may be continuously practised without the operation of removal by using less than 20% by weight, based on propylene, of 1-olefin other than propylene. The monomers can be used in combinations two or more.

When the number of replacement of monomer during the polymerisation is small, a homopolymer comprising only one of said monomers is produced in an increasing ratio in addition to a heteroblock copolymer. For instance, if there is only one replacement, most of the obtained polymer is a homopolymer and a heteroblock polymer accounts for only a small part of it. Even when the replacement is done only once, the physical and mechanical properties of the obtained polymer are different from those of a homopolymer of the monomer that constitutes it. But these properties are similar to those of a mixture of homopolymers which has the same proportion as that in the heteroblock copolymer. On the other hand, when replacement is done as often as 40 times for instance, the obtained polymer consists mostly of a heteroblock polymer. The properties of such polymer are characteristically different from those of a mixture of homopolymers. For instance, a polypropylene shaped article has a good transparency but has a high brittle temperature. A high density polyethylene shaped article has a low brittle temperature but is not transparent. However, a shaped article of a heteroblock copolymer which is obtained with the replacement of 40 times has a transparency near that of polypropylene and a brittle temperature intermediate between that of polypropylene and that of polyethylene. Such favourably marked change in properties can be achieved only by a heteroblock copolymer. In order to achieve a sufficiently great effect of improving the properties, therefore, it is necessary to increase the number of replacement. Usually, good results are obtained by 10 to 50 times of replacement. In accordance with this invention, amounts of formation of non-crystalline, commercially valueless copolymer can be more markedly reduced than that formed by conventional methods wherein many times of monomer replacement are carried out with propylene and ethylene or 1-olefin. This is one of the marked advantages obtained in accordance with the process of this invention.

The excellent effectiveness of this invention will become apparent by reference to the following examples. The percent values shown in the following examples are all percent by weight.

Examples 1 to 3 show that the catalyst composition obtained in accordance with the process of this invention has excellent size distribution of particles.

EXAMPLE 1

Titanium tetrachloride was reduced with powder of metallic aluminum in the presence of aluminum trichloride to form a compound represented by $3TiCl_3 \cdot AlCl_3$. One hundred grams of this compound were put in a vibrational mill whose inside atmosphere had been substituted by nitrogen having an oxygen content of less than 20 p.p.m. and a water content of 40 p.p.m. After the addition of 2 g. of titanium tetrachloride and 9.6 g. of diethylether (about 0.13 gram mole), the mixture was pulverised for about 20 hours. The content of coarse particles and that of fine particles in the so obtained titanium trichloride composition were 6.3% and 0.9%, respectively. The contents of fine particles and of coarse particles were determined by the following procedures:

(1) *Coarse particle content.*—Ten grams of the pulverised composition were passed through a 150 mesh sieve (Tyler mesh) in a nitrogen atmosphere, and the weight of the particles remaining on the sieve was measured. The coarse particle content was expressed in terms of weight percent of the remaining particles based on 10 grams of the pulverised composition. The coarse particle used herein means a particle having a diameter more than 105 microns.

(2) *Fine particle content.*—The pulverised composition was put in a vertical tube whose inside atmosphere was completely substituted by nitrogen, and from the bottom of the tube, nitrogen was introduced for 15 hours at a rate of 0.7 cm. per second. Fine particles which overflowed the vertical tube were collected in a collector connected thereto. The ratio of the amount caught in a collector to that charged was shown in terms of weight percent and used as an indicator showing fine particle content in the pulverised product.

Under the above measuring conditions particles having a diameter less than 10 microns overflow. Thus, the fine particle used herein means a particle having a diameter less than 10 microns.

EXAMPLE 2

The titanium trichloride containing aluminum chloride described in Example 1 was pulverised in the same manner as in Example 1 except that titanium tetrachloride was not added. The coarse particle and fine particle contents were 2.4% and 4.6%, respectively.

On the other hand, in a control experiment, the same of titanium trichloride containing aluminum chloride was pulverised in the same manner except that diethylether was not added. The fine particle content of the product measured was 24.1%.

EXAMPLE 3

The titanium trichloride containing aluminum chloride described in Example 1 was pulverised for 20 hours in an atmosphere of argon gas having an oxygen content of 10 p.p.m. and a water content of 40 p.p.m. by means of a vibrational mill. The coarse particle and fine particle contents of the pulverised product were 6.3% and 26.1%, respectively. The pulverised product obtained was reduced and 1 kilogram of the reduced product was collected and was added to 100 liters of the purified heptane deoxygenized with nitrogen, followed by stirring. The suspension of pulverised product was classified at a stream speed of 10 m. per second using a standard cyclone having a diameter of 50 mm. The separated suspension was filtered in an atmosphere of nitrogen having an oxygen content of 20 p.p.m. and a water content of 40 p.p.m. and dried in a stream of nitrogen. Thus, there was obtained said classified product whose fine particle portion weighed 220 g. and the remainder weighed 771 g. 9.25 g. of di-n-butylether (0.0712 g. mole) were added to the portion of fine particles, and was pulverised in an atmosphere of nitrogen for 20 hours by means of a vibrational mill. There were obtained 225 g. of the product, which was added to 771 g. of the said remainder to form 976 g. of a titanium trichloride composition. The coarse particle and fine particle contents measured in accordance with Example 1 were 6.4% and 12.3%, respectively.

Examples 4 to 12 show that the titanium trichloride composition and the obtained polymer in accordance with the method of this invention have excellent shapes and size distribution of particles, with a small amount of the atactic polymer produced.

EXAMPLE 4

One hundred grams of titanium trichloride containing aluminum chloride represented roughly by the formula $3TiCl_3 \cdot AlCl_3$ which was obtained by reducing titanium tetrachloride with powder of metallic aluminum in the presence of aluminum chloride were fed into a steel ball mill whose interior atmosphere was substituted by nitrogen and, on addition of 1.5 g. of titanium tetrachloride and 7 g. of diethylether, was pulverized for 50 hours. The obtained black violet powdery composition was sieved by means of a Tyler standard sieve of 150 mesh. There were obtained 86 g. of powder which passed through it. The coarse particle and fine particle contents of the so obtained titanium trichloride composition were 0% and 2.9%, respectively.

One litre of purified heptane deoxygenized with nitrogen was put in a stirring type stainless steel autoclave having 3 litres of interior volume whose interior atmosphere was substituted by nitrogen, followed by the addition of 1 g. of the above-mentioned sieved composition of titanium trichloride and 1.5 g. of diethylaluminum monochloride. After substituting the interior of the autoclave by propylene, hydrogen was put in the autoclave until the partial pressure reached 0.5 kg./cm.$^2$. Then, propylene was again put in to increase the entire pressure to 3 kg./cm.$^2$ (gage). While stirring and heating, the polymerisation started at 75° C. While supplying propylene continuously, polymerisation was continued for 3 hours at 70° C., 5 kg./cm.$^2$.

Upon addition of methanol, polymerisation was stopped and after cooling, the contents were taken out. Then, they were stirred with water to remove catalyst residue. The polymer slurry free from the catalyst residue was heated and filtered, and washed with heptane to remove an atactic polypropylene. After removal of heptane by means of steam, the product was dried at reduced pressure to give 583 g. of a crystalline, solid powdery polypropylene. As a result of sieving this polypropylene, it was found that the product did not contain coarse particles having a size larger than 16 mesh, the content of fine particles having a size smaller than 250 mesh being 1.4%. Namely, the polypropylene obtained in this example had such a narrow particle size distribution that 98.6% of the polymer particles has a diameter ranging from 62 to 1000 microns.

EXAMPLE 5

The same procedures as in Example 4 were repeated except that titanium tetrachloride was not added prior to pulverisation of titanium trichloride containing aluminum chloride. The coarse particle and fine particle contents of the so obtained titanium trichloride composition were 0% and 4.0%, respectively. After a period of 2 hours and 40 minutes, there were obtained 580 g. of a crystalline, solid powdery polypropylene. As a result of sieving, it was found that coarse particles having a size larger than 16 mesh were not present, the content of fine particles having a size smaller than 250 mesh being 4.2%.

In a control experiment, the same procedure was repeated except that diethylether was not added prior to pulverisation of titanium trichloride containing aluminum chloride. The coarse particle and fine particle contents of the obtained titanium trichloride composition were 11.2% and 24.0%, respectively. After a period of 2.5 hours, there were obtained 540 g. of a crystalline, solid powdery polypropylene. As a result of sieving this polypropylene, it was found that there was 12% of coarse particles having a size larger than 16 mesh and 24% of fine particles having a size smaller than 250 mesh.

In another control experiment, the same procedure was repeated except that 0.1 g. of diethylether was added to 1 g. of said pulverised titanium trichloride containing aluminum chloride. After 2.5 hours of polymerisation, there were obtained 520 g. of a crystalline solid powdery polypropylene. As a result of sieving the polypropylene, it was found that there was 12.4% of coarse particles having a size of more than 16 mesh and 22.8% of fine particles having a size smaller than 250 mesh.

As is apparent from the above results, the catalyst prepared in accordance with the process of this invention can produce the polypropylene having an extremely narrower particle size distribution as compared with catalysts prepared with the known processes. Further, it will be understood that it can extremely reduce the content of finely divided polymer particles which cause various troubles in the industrial production of propylene polymers. This is a great advantage of this invention. Still further, it will be seen that mere addition of diethyl ether to the catalyst system cannot improve remarkably the polymer particle size distribution.

EXAMPLE 6

One litre of purified heptane deoxygenized by nitrogen was put in a 3-litre stirring type stainless steel autoclave whose interior atmosphere was substituted by nitrogen. Then, there were added one gram of the composition prepared by pulverisation as described in Example 4 and 1.5 g. of dipropylaluminum monochloride. Thereafter, the inside atmosphere of the autoclave was substituted by propylene and 20 g. of n-pentene were added. Then, hydrogen was put therein until the pressure reached 0.4 kg./cm.$^2$ and with subsequent addition of propylene, the total pressure was increased to 3 kg./cm.$^2$. With the raise of temperature to 65° C. copolymerisation was started at a pressure of 5 kg./cm.$^2$. The reduction of pressure during the progress of the copolymerisation was compensated for by the addition of liquid propylene containing 1.5 mole percent n-pentene-1. Copolymerisation was continued for 5 hours at a temperature of 65° C. and a pressure of 5 kg./cm.$^2$. The copolymerisation product was treated in the same manner as in Example 4 to form 416 g. of solid powdery copolymer of propylene and n-pentene.

As a result of sieving this copolymer, it was found that there were 1.8% of coarse particles having a size larger than 16 mesh and 3.8% of fine particles having a size smaller than 250 mesh.

A control sample of a propylene-n-pentene copolymer was prepared by the same procedure as mentioned above except that diethylether was not added. As a result of sieving this copolymer, it was found that there were 14% of coarse particles having a size larger than 16 mesh and 18% of fine particles having a size smaller than 250 mesh.

From the results of this example it is evident that also in the copolymerisation the process of this invention can extremely reduce the particle size distribution in the resulting copolymer.

EXAMPLE 7

A 1-litre vibrational mill packed with 600 ml. of steel ball with a diameter of 12 mm. (manufactured by Siebtechnik Company) was charged with 50 g. of titanium trichloride Grade A (composition of aluminum chloride with titanium trichloride obtained by reduction of titanium tetrachloride with metallic aluminum) made by Stauffer Chemical Company and 5 g. of methylethyl ketone in an atmosphere of nitrogen and pulverisation was carried out for 20 hours. The pulverised composition were taken out in an atmosphere of nitrogen and separated from the steel ball. The obtained titanium trichloride compositon weighed 54 g. The coarse particle and fine particle contents of the composition were 8.6% and 3.8%, respectively.

A 2-litre stainless autoclave was charged with 900 ml. of heptane, 0.6 g. of said titanium trichloride composition and 1.2 g. of diethylaluminum monochloride in the presence of an atmosphere of nitrogen. After discharging the nitrogen present in the autoclave by means of a vacuum pump, hydrogen was put therein until the partial pressure of a gaseous phase reached 0.3 kg./cm.$^2$. Subsequently, by introducing propylene, the pressure of the gaseous portion was adjusted to 2 kg./cm.$^2$.

The contents in the autoclave were heated while stirring and in 15 minutes the interior temperature was raised to 70° C. and at this temperature polymerisation was continued. During the polymerisation, propylene was continuously pressed in to maintain the inside pressure at 5 kg./cm.$^2$. When the amount of propylene introduced reached 500 g. the introduction of propylene was stopped and the unreacted gas was discharged.

After cooling the autoclave, the contents were taken out and diluted with 700 ml. of heptane. With addition of 200 ml. of methanol, stirring was effected for 5 hours at 55° C. to decompose the catalyst completely. Thereafter, stirring was effected with addition of 200 ml. of water. The mixture was then left to stand stationary to separate a layer of water. This procedure was repeated three times to remove the catalyst in the form of an aqueous solution. Then, by blowing steam into a suspension of the polymer, the heptane was completely distilled off. After the removal of the heptane, the suspension was filtered and dried at 60° C. at reduced pressure to give 500 g. of powdery polypropylene. This polypropylene showed no adhesion with aggregating tendency.

As control sample, the following two polymers were prepared.

(a) Polymerisation of propylene and its after-treatment were carried out in the same manner as in Example 7 except that there was used in place of the catalyst composition of Example 7 (0.6 g.), 0.6 g. of a titanium trichloride composition prepared by pulverising titanium trichloride A grade (manufactured by Stauffer Chemical Co.) without the addition of methylethylketone. The coarse and fine particle contents of the titanium trichloride composition used in this control experiment were 8.5% and 22.1%, respectively. In the control sample, part of polymer was in the form of lump in a step of distilling off heptane with steam. This was due to the adhesiveness of the atactic polymer contained in a considerably great amount in the product of this control method.

(b) Polymerisation of propylene and its after-treatment were carried out in the same manner as in Example 7 except that a mixture of 0.6 g. of a titanium trichloride composition pulverised in (a) above, 1.2 g. of diethylaluminum monochloride and 0.1 g. of methylethylketone was used as a catalyst. In this control experiment, aggregation of polymer resulting from adhesion was observed. Results are shown in Table 1.

TABLE 1

| | Yield (g.) | Soluble matter in powdery polypropylene in extraction with n-heptane (percent) | Properties of moulded article | | | Result of sieving test | | |
|---|---|---|---|---|---|---|---|---|
| | | | Stress at yield point (kg./cm.²) | Softening point (° C.) | Rockwell hardness | Above 1,000μ (percent) | Below 60μ (percent) | Size of 80% of the product (μ) |
| Example 7 | 500 | 3.6 | 350 | 152 | 101 | 9.2 | 3.7 | 200–1,000 |
| Control: | | | | | | | | |
| (a) | 502 | 13.7 | 260 | 133 | 96 | | | |
| (b) | 498 | 14.2 | 258 | 133 | 96 | | | |

EXAMPLE 8

Polymerisation of propylene was carried out in the same manner as in Example 7. After removal of the catalyst from the reaction product, a suspension of polymer was heated to 60° C. and hot filtered. This filtered cake was washed with heptane heated to 60° C. Thereafter, heptane was distilled off by blowing steam into the cake. After drying at 60° C. at reduced pressure, there was obtained white powdery polypropylene. The filtered liquid was mixed with the washing liquid, and after distilling the heptane off, the mixture was dried to give an atactic polypropylene besides said powdery polypropylene.

As control sample for this example, the following two polymers were prepared.

(a) Propylene was polymerised by the same method as that used in making the control sample (a) described in Example 7. A suspension of the polymer after removal of the catalyst was treated in the same manner as in Example 8 to give powdery polypropylene and atactic polypropylene.

(b) Propylene was polymerised by the same method as one used in making the control sample (b) described in Example 7. A suspension of the polymer after removal of the catalyst was treated in the same manner as in Example 8 to give powdery polypropylene and atactic polypropylene. Results are shown in Table 2.

TABLE 2

| | Example 8 | Control (a) | Control (b) |
|---|---|---|---|
| Yield (g.): | | | |
| Powdery polypropylene | 487 | 452 | 450 |
| Atactic polypropylene | 13 | 48 | 49 |
| Soluble matter in powdery polypropylene in extraction with n-heptane (percent) | 1.0 | 4.9 | 4.8 |
| Ratio of residue after extraction to total polymer (percent) | 96.2 | 86.5 | 85.5 |
| Properties of test piece: | | | |
| Stress at yield point (kg./cm.²) | 368 | 348 | 348 |
| Softening point (° C.) | 155 | 153 | 151 |
| Rockwell hardness | 104 | 101 | 101 |
| Results of sieving test: | | | |
| Above 1,000μ (percent) | 9.0 | 8.5 | 8.7 |
| Below 60μ (percent) | 3.7 | 21.7 | 21.6 |

As is apparent from the results given in Table 2 above, the process of this invention comprising the copulverisation of methylethylketone and the titanium trichloride component can reduce remarkably the size distribution of the polypropylene over the conventional art. Further, it is evident that the process of this invention where methylethylketone and the titanium chloride component are copulverised can heighten the ratio of the heptane-insoluble crystalline polypropylene in the resulting polypropylene by about 10% as compared with the known process where methylethylketone is merely added as one catalyst component.

EXAMPLE 9

A 2-litre stainless steel autoclave was charged with 900 ml. of heptane, 0.7 g. of the titanium trichloride composition described in Example 7 and 2 g. of diisobutylaluminum monochloride. After discharging nitrogen out of the autoclave, hydrogen was pressed in until the partial pressure of a gaseous phase reached 0.2 kg./cm.² and subsequently, propylene containing 5% butene-1 was introduced until the pressure reached 0.8 kg./cm.². While stirring, the temperature was raised to 70° C. and copolymerisation was started. The interior pressure was maintained at 2 kg./cm.² throughout the copolymerisation by replenishing propylene containing 5% of butene-1. When 400 g. of the monomers were copolymerised, the copolymerisation was stopped and the residual gas was discharged. With addition of 200 ml. of methanol, stirring was done for one hour at 80° C. to decompose the catalyst completely. After cooling, the contents were taken out and, on addition of 900 ml. of heptane, washed thoroughly with water. Subsequently, the slurry was heated to 60° C. and filtered. The cake free from an atactic polymer was dried at 60° C. at a reduced pressure to form a powdery copolymer. Then, heptane was distilled off from said filtrate. After drying, there was obtained an atactic polymer.

In order to make comparison with this example, the following copolymer was prepared as a control sample.

Copolymerisation of propylene and butene-1 and its after-treatment were carried out in the same manner as mentioned above except that in place of the titanium trichloride composition described in Example 7, the same quantity of the pulverised titanium trichloride (control sample (a) described in Example 7) was used. There were obtained a powdery copolymer and an atactic polymer. Results of Example 9 are shown in Table 3.

TABLE 3

| | Example 9 | Control |
|---|---|---|
| Yield (g.): | | |
| Powdery copolymer (A) | 375 | 316 |
| Atactic polymer (B) | 26 | 84 |
| Ratio of powdery copolymer (A/A+B×100), percent | 93.6 | 79.0 |
| Properties of copolymer: | | |
| Ratio of residue after extraction with n-heptane (percent) (C) | 95.2 | 93.6 |
| Content of butene-1 | 3.8 | 1.7 |
| Particle size (percent) by weight for particles with a size of 200–1,000μ | 82.1 | 57.4 |
| Ratio of residue after extraction with n-heptane to the total polymer (A/A+B×C/100 ×100), percent | 89.1 | 73.9 |

Table 3 clearly shows that both the improvement of the particle size distribution in the resulting copolymer and the increase of the yield of the crystalline copolymer can be attained at the same time by the process of this invention.

EXAMPLE 10

By the same method as in Example 7, 50 g. of titanium trichloride AA Grade (prepared by reducing titanium tetrachloride with metallic aluminum and activating) manufactured by Stauffer Chemical Co. and 2 g. of acetophenone were pulverised to give 51 g. of a composition for catalyst. The coarse particle and fine particle contents of the composition were 9.2% and 8.6%, respectively.

Procedures of Example 8 were repeated except the use of 0.7 g. of this composition for a catalyst to form 481 g. of powdery polypropylene and 19 g. of atactic polymer. The ratio of extraction of the powdery polypropylene with boiling n-heptane was 2.8%, and the ratio of the residue after extraction to the total polymer with n-heptane was 93.3%. The test piece of a moulding of the powdery polypropylene of this example, exhibited excellent physical and mechanical properties, having a stress at a yield point of 350 kg./cm.$^2$, a softening point of 151° C. and a Rockwell hardness of 102. The powder had 9.6% of coarse particles having a size of larger than 1000 microns and 8.3% of fine particles having a size smaller than 60 microns, showing a narrow range of particle size distribution.

EXAMPLE 11

Using the same pulveriser as in Example 7, 50 g. of a titanium trichloride component represented by

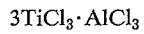

$$3TiCl_3 \cdot AlCl_3$$

which was obtained by reduction of titanium tetrachloride with metallic aluminum and 4.5 g. of diethylketone were pulverised for 25 hours to give 53 g. of a titanium trichloride composition. The composition was sieved by means of 150 mesh Tyler standard sieve. By this operation, 11 g. of the composition remained behind and 41 g. passed through. To 11 g. of the remaining composition were added 39 g. of said titanium trichloride component, and on addition of 4.5 g. of diethylketone the mixture was copulverised for 25 hours. In this method, pulverisation was repeated by adding what remained behind the sieve at the time of the following pulverisation. In the first several operations, the pulverised substance remaining on the sieve was increased, until it weighed 15 g. constantly. The composition that passed through the sieve in the 10th operation was used as a catalytic component. The coarse particle and fine particle content of the composition were 0% and 2.7%, respectively.

Procedures of Example 8 were repeated except that 0.7 g. of the said titanium component was used to give 483 g. of powdery polypropylene and 17 g. of an atactic polymer. The ratio of residue of powdery polypropylene after extracttion with boiling n-heptane was 96.7%, and said ratio in respect of the entire polypropylene obtained reached 93.5%, remarkably higher than that of the control sample (a) described in Example 8. The moulded test piece of the powdery polypropylene had a stress at a yield point of 353 kg./cm.$^2$, a softening point of 153° C. and a Rockwell hardness of 102. Its size distribution was very narrow. The content of particles having a diameter of 200 to 1000 microns reached 94%, and there were practically no content of fine particles having a size smaller than 60 microns.

EXAMPLE 12

Using the apparatus in Example 7, 50 g. of the titanium trichloride component used in Example 11, 0.5 g. of titanium tetrachloride and 9 g. of diphenylketone were pulverised for 30 hours to give 58 g. of a composition for catalyst. The coarse particle and fine particle contents of the composition were 7.8% and 11.3%, respectively.

Procedures of Example 8 were repeated, except that 0.7 g. of this composition was used, to give 475 g. of powdery polypropylene and 26 g. of atactic polymer. The ratio of the residue of the powdery polypropylene after extraction with boiling n-heptane was 95.4%. Therefore, the ratio of the residue after extraction to the total polypropylene obtained was 90.7% which is larger than the ratio of 86.5% with the control sample (a) described in Example 8. The moulded test piece of the powdery polypropylene has a stress at a yield point of 348 kg./cm.$^2$, a softening point of 153° C. and a Rockwell hardness of 102. The powdery polypropylene contained 8.4% of particles having a size larger than 1000 microns and 12.1% of fine particles having a size smaller than 60 microns, showing an improved size distribution as compared with that of the control sample.

The examples hereinafter shown refer to the application of this invention to the manufacture of a heteroblock copolymer.

EXAMPLE 13

A 2-litre stainless steel autoclave was charged with 900 ml. of purified white kerosene (B.P., 200 to 220° C.), 2 g. of dipropylaluminum monochloride and 0.7 g. of the titanium trichloride composition described in Example 7 in an atmosphere of nitrogen. After discharging the nitrogen out of the autoclave, hydrogen was introduced thereinto until the partial pressure of the gaseous phase reached 0.2 kg./cm.$^2$ and subsequently, propylene was introduced thereinto until the pressure reached 3 kg./cm.$^2$. While stirring, the autoclave was heated to a temperature of 70° C. and polymerisation was started. The interior pressure was maintained throughout the polymerisation by replenishing propylene. When 90 g. of the propylene were polymerised, the introduction of propylene was stopped and the propylene was discharged until the pressure of the residual propylene was lower than 0.1 kg./cm.$^2$. Thereafter, nitrogen was introduced until the pressure reached 1 kg./cm.$^2$ and thereafter discharged. This operation was repeated three times to remove the residual propylene. Then, the nitrogen was discharged out of the autoclave, and ethylene was introduced until the pressure reached 1 kg./cm.$^2$. Polymerisation was continued at 70° C. When 10 g. of the ethylene were polymerised, the introduction of ethylene was stopped and the ethylene was removed by the same method as with the case of propylene mentioned above. The operation beginning from the introduction of hydrogen and ending in the removal of ethylene was regarded as one cycle. This cycle was repeated four times more, totalling 5 times, and the polymerisation was terminated. With the addition of 200 ml. of butanol, stirring was done at 80° C. for 30 minutes. After cooling, the contents were taken out. The thus obtained heteroblock copolymer slurry was diluted with 900 ml. of purified white kerosene and heated to 80° C. and at this temperature filtered to separate a solid copolymer. The filtered cake was repeatedly washed under heating with an aqueous solution saturated with butanol and acidified with hydrochloric acid, followed by washing with water. It was then dried at 60° C. at reduced pressure to give powdery heteroblock copolymer. The filtrate was evaporated to dryness to give an atactic polymer.

In order to make comparison with this example, the following heteroblock copolymer was prepared as a control sample.

Propylene and ethylene were copolymerised and aftertreated by the same method as in Example 13 above except that the pulverised titanium trichloride composition (control sample (a) described in Example 7) in which methylethylketone was not incorporated was used in place of the composition for catalyst described in Example 7 which was used in Example 13. There were obtained powdery heteroblock copolymer and atactic polymer.

Results of this example are shown in Table 4.

TABLE 4

|  | Example 13 | Control |
|---|---|---|
| Yield (g.): |  |  |
| Powdery heteroblock copolymer (A) | 492 | 452 |
| Atactic copolymer (B) | 10 | 49 |
| Ratio of powdery heteroblock copolymer (A/A+B), percent | 98.0 | 90.2 |
| Properties of powdery heteroblock copolymer: |  |  |
| Ratio of residue after extraction with n-heptane (percent) (C) | 94.1 | 93.0 |
| Content of ethylene (percent) | 9.0 | 7.9 |
| Stress at yield point (kg./cm.$^2$) | 274 | 264 |
| Brittle temperature | −20 | −14 |
| Charpy impact value | >33 | 24 |
| Results of sieving test of block copolymer: |  |  |
| Above 1,000 (p$\mu$ercent) | 8.3 | 8.3 |
| Below 60$\mu$ (percent) | 2.6 | 21.6 |
| Ratio of residue after extraction with n-heptane to the total polymer (A/A+B+C/100×100) percent | 92.2 | 83.9 |

As is apparent from Table 4 above, the process of this invention makes it possible to improve coincidentally the particle size distribution of the propylene-ethylene block copolymer and the yield of the crystalline polymer. Further, the resulting block copolymer of this invention is far more excellent in mechanical properties over the product obtained in the conventional process.

EXAMPLE 14

A 1.5-litre steel ball mill packed with a steel ball was charged with 50 g. of titanium trichloride component represented by 3TiCl$_3$·AlCl$_3$ obtained by reduction of titanium tetrachloride with metallic aluminum, 4 g. of methylisobutylketone in an atmosphere of nitrogen. After 50 hours' pulverisation, the contents were taken out in an atmosphere of nitrogen, and separated from the ball. There were obtained 53 g. of a titanium trichloride composition for catalyst. This composition was sieved by means of 150 mesh Tyler standard sieve. By this operation, 42 g. of the composition passed through the sieve and were used as a component of the copolymerisation catalyst. The coarse particle and fine particle contents of the composition were 0.3% and 5.3%, respectively.

A 2.5-litre interior stirring type stainless steel autoclave was charged with 900 ml. of heptane, 0.6 g. of said titanium trichloride component and 1 g. of diethylaluminum chloride in an atmosphere of nitrogen. The nitrogen was discharged out of the autoclave, and while stirring, hydrogen was introduced until the partial pressure reached 0.1 kg./cm.$^2$. Subsequently, propylene was introduced until its pressure reached 2 kg./cm.$^2$. The temperature was raised to 70° C. by heating. With the inside pressure maintained at 5 kg./cm.$^2$ by supplying propylene, propylene was polymerised. When 100 g. of propylene were polymerised, the supply of propylene was stopped. Then, in place of propylene, ethylene was replenished to maintain the inside pressure at 5 kg./cm.$^2$. When the amount of ethylene introduced reached 4 g., the introduction of ethylene was again replaced by that of propylene. The operation beginning from the introduction of 100 g. of propylene and ending in the introduction of 4 g. of ethylene was regarded as one cycle. This cycle was repeated five times before the polymerisation was terminated. The residual gas was discharged and with addition of 200 ml. of methanol, stirring was done at 80° C. for one hour. After cooling, the contents were taken out and diluted with 500 ml. of heptane. The catalyst was removed by washing with water. The slurry free from the catalyst was maintained at 60° C. and thereafter filtered to separate a solid copolymer. Steam was then blown into the filtered cake to remove the heptane. It was then dried at 60° C. at reduced pressure to give white powdery propylene-ethylene heteroblock copolymer. Also, the filtrate was evaporated to dryness to give an atactic polymer.

In order to make comparison with this example, the following heteroblock copolymer was prepared as control sample.

Heteroblock copolymerisation of ethylene and propylene and its after-treatment were carried out in the same manner as in this example except that in place of the composition of this example, there was used a titanium trichloride pulverised without methylisobutylketone. The coarse particle and fine particle contents of the titanium trichloride of the control experiment were 12.4% and 26.1%, respectively.

Results of this example are shown in Table 5.

TABLE 5

|  | Example 14 | Control Sample |
|---|---|---|
| Yield (g.): |  |  |
| Powdery heteroblock copolymer (A) | 489 | 457 |
| Atactic polymer (B) | 26 | 58 |
| Ratio of powdery heteroblock copolymer (A/A+B×100), percent | 95.0 | 88.6 |
| Properties of powdery heteroblock copolymer: |  |  |
| Ratio of residue after extraction with n-heptane (percent) (C) | 93.4 | 92.1 |
| Content of ethylene (percent) | 1.7 | 0.9 |
| Stress at yield point (kg./cm.$^2$) | 295 | 290 |
| Brittle temperature (° C.) | −17 | −8 |
| Charpy impact value (kg. cm./cm.$^2$) | >32 | 24 |
| Intrinsic viscosity at 135° C. in tetralin solution | 2.72 | 2.7 |
| Particle size distribution (content of particles having a size of 200 to 1,000$\mu$) (percent) | 90 | 57 |
| Ratio of residue after extraction with n-heptane to total polymer (A/A+B× C/100×100) (percent) | 88.7 | 81.6 |

As is apparent from Table 5 above, the process of this invention where the titanium trichloride component and methylisobutylketone are copulverised can narrow remarkably the particle size distribution range of the resulting block copolymer as compared with the conventional art.

EXAMPLES 15 TO 17

Titanium trichloride obtained by reduction of titanium tetrachloride was pulverised for 25 hours in the same manner as in Example 7 to give titanium trichloride in the form of fine powder. Fifty (50) g. of this titanium trichloride in the form of fine powder, 1 g. of titanium tetrachloride and 4 g. of methyl n-amylketone were pulverised for 25 hours in a steel ball mill to give 54 g. of a titanium trichloride composition (Example 15). The coarse particle and fine particle contents of the composition were 9.6% and 3.7%, respectively.

By using the apparatus of Example 7, 50 g. of said titanium trichloride in the form of fine powder were pulverised for 15 hours. At the end of pulverisation, 1 g. of titanium tetrachloride and 4 g. of n-amylketone were added and the mixture was pulverised for 100 hours to give 54 g. of a composition for catalyst. The coarse particle and fine particle contents of the composition were 9.6% and 4.3% respectively (Example 16).

Fifty (50) grams of said titanium trichloride and 1 g. of titanium tetrachloride were pulverised by means of the apparatus of Example 7 for 15 hours. At the end of the pulverisation, 4 g. of methyl n-amylketone were added and the mixture was pulverised for 10 hours to give 54 g. of a catalyst composition. The coarse particle and fine particle contents of the composition were 9.9% and 3.7%, respectively (Example 17).

To each of the catalyst components prepared in the above Examples 15 to 17, di-n-propylaluminum monochloride was added to make catalysts. Using each of these catalysts, the heteroblock copolymerisation of ethylene and propylene was carried out by the following method.

A 2.5-litre stainless steel autoclave was charged with 900 ml. of purified white kerosene (B.P. 200 to 220° C.) and said catalyst in an atmosphere of nitrogen. The nitrogen was discharged out of the autoclave, and propylene containing hydrogen was pressed in until the pressure reached 3 kg./cm.$^2$. Heating was done from outside and while stirring, the temperature was maintained at 70° C. Polymerisation of propylene was carried out while maintaining the interior pressure at 5 kg./cm.$^2$ by supply of propylene.

During the polymerisation of propylene, the amount of hydrogen to be supplied was adjusted so that the partial pressure of hydrogen in the gaseous phase in the autoclave might be 0.3 kg./cm.² When 430 g. of propylene were polymerised, the introduction of propylene was stopped and the residual propylene was discharged to lower the interior pressure to less than 0.1 kg./cm.² Subsequently, ethylene was introduced and polymerisation was carried out while supplying ethylene to adjust the interior pressure to 1 kg./cm.² Polymerisation was terminated when 70 g. of ethylene were polymerised. The polymerised substance was thereafter treated in the same manner as in Example 13 to give a powdery propylene-ethylene heteroblock copolymer and an atactic polymer.

In order to make comparison with Examples 15 to 17, the following control sample was prepared.

Heteroblock copolymerisation of ethylene and propylene and its after-treatment were carried out in the same manner as in Examples 15 to 17 except that in place of the titanium trichloride composition of Examples 15 to 17, there was used titanium trichloride in the form of fine powder in which methyl n-amylketone was not incorporated. The coarse particle and fine particle contents of the titanium trichloride used in the control experiment were 12.3% and 26.2%, respectively.

These results are shown in Table 6.

TABLE 6

| | Example | | | Control |
|---|---|---|---|---|
| | 15 | 16 | 17 | |
| Yield (g.): | | | | |
| Powdery heteroblock copolymer (A) | 473 | 477 | 476 | 440 |
| Atactic polymer (B) | 27 | 24 | 23 | 62 |
| Ratio of powdery heteroblock copolymer (A/A+B×100) (percent) | 94.6 | 95.2 | 95.4 | 87.6 |
| Properties of powdery heteroblock copolymer: | | | | |
| Ratio of residue after extraction with n-heptane (percent) (C) | 90.2 | 90.8 | 90.8 | 82.7 |
| Content of ethylene (percent) | 6.8 | 6.6 | 6.8 | 6.0 |
| Stress at yield point (kg./cm.²) | 272 | 270 | 270 | 268 |
| Brittle temperature (° C.) | −20 | −20 | −24 | −13 |
| Charpy impact value (kg. cm./cm.²) | >32 | >32 | >32 | >26.2 |
| Intrinsic viscosity at 135° C. in Tetralin solution | 2.98 | 3.00 | 2.92 | 3.02 |
| Particle size distribution (content of particles having a size of 200–1,000μ) (percent) | 77.4 | 76.3 | 77.0 | 56.2 |
| Ratio of residue after extraction with n-heptane to total polymer (A/A+B×C/100 ×100) (percent) | 85.3 | 86.4 | 86.6 | 72.4 |

As is apparent from Table 6 above, even when the time of addition of titanium tetrachloride and methylamylketone is varied, no substantial change in the effect attained in the process of this invention is brought about if only they are copulverised after the addition. Further, in accordance with the process of this invention there can be obtained block copolymers excellent in the particle size distribution and the crystalline block copolymer content as compared with block copolymers obtained in accordance with the conventional art.

EXAMPLES 18 AND 19

The following materials were fed under atmosphere of nitrogen into a vessel of a 1-litre vibration mill in which a steel ball having a diameter of 12 mm. and having volume as much as 40% of that of the mill is packed.

(a) 50 g. of titanium trichloride Grade A (manufactured by Stauffer Chemical Co.) (Control).

(b) 50 g. of a titanium trichloride Grade A and 6.7 g. of di-n-butylether (Example 18).

(c) 50 g. of a titanium trichloride Grade A, 0.3 g. of titanium tetrachloride and 4.5 g. of di-n-butylether (Example 19).

After covering, the vessel was fixed on the vibrational machine and shaken for 25 hours. The contents were then taken out in an atmosphere of nitrogen and separated from the steel ball to give a pulverised composition for catalyst.

The contents of coarse and fine particles of the compositions obtained by methods (a), (b) and (c) were as follows:

| | Particle content | |
|---|---|---|
| | Coarse, percent | Fine, percent |
| Composition by method: | | |
| (a) | 12.1 | 26.1 |
| (b) | 4.8 | 3.7 |
| (c) | 5.2 | 2.6 |

A heteroblock copolymer of propylene and butene-1 was synthesised by the method shown below using 0.7 g. of the said titanium trichloride composition and 1.2 g. of diethylaluminum monochloride.

Said catalyst and 1000 ml. of heptane were fed under atmosphere of nitrogen into a 2.5-litre interior stirring type stainless steel autoclave. After substituting the nitrogen in the autoclave by propylene, hydrogen and propylene were pressed in until the partial pressure reached 0.4 kg./cm.² and 0.6 kg./cm.², respectively. Then heating was done to a temperature of 70° C. and polymerisation was started. Throughout the polymerisation, the interior pressure was maintained at 2 kg./cm.² by additional supply of the monomer. When 45 g. of propylene was converted to a polymer, the introduction of propylene was stopped and replaced by that of butene-1 in an amount of 5 g. Then, again it was replaced by propylene. Thereafter, 45 g. of propylene and 5 g. of butene-1 were fed one after another. When the total amount of propylene and butene-1 reached 450 g., it was again replaced by propylene in an amount of 50 g. Then the polymerisation was terminated. (If one cycle includes each one introduction of propylene and butene-1, the number of cycle in this Example was 9.5 and the number of operation of replacement was 18.)

After the termination of the introduction of propylene, the residual gas was discharged and after cooling, 50 ml. of butanol was added. Stirring was done for 1 hour at 80° C. to decompose the catalyst. While maintaining the temperature at 60° C., the polymer slurry was pressure filtered, and the separated copolymer cake was washed with heptane. The cake was steamed to remove the heptane and dried at 65° C. at reduced pressure to give a white powdery crystalline heteroblock copolymer. Also, the filtrate and washing liquid were evaporated to give a noncrystalline copolymer.

Results are shown in Table 7.

TABLE 7

| | Example | | Control |
|---|---|---|---|
| | 18 | 19 | |
| Yield of heteroblock copolymer (g.): | | | |
| Crystalline (A) | 514 | 526 | 465 |
| Non-crystalline (B) | 36 | 24 | 85 |
| Ratio of crystalline copolymer (A/A+B×100) percent | 93.5 | 95.7 | 84.5 |
| Properties of crystalline heteroblock copolymer: | | | |
| Content of butene (wt. percent) | 7.3 | 7.6 | 5.8 |
| Ratio of residue after extraction with n-heptane (Percent) (C) | 94.2 | 94.7 | 93.6 |
| Melt-index | 17 | 16 | 15 |
| Brittle temperature (° C.) | 2 | 0 | 5 |
| Particle size distribution (content of particles having a size of 60–1,000μ) (Percent) | 90.6 | 93.1 | 58.1 |
| Ratio of residue after extraction with n-heptane to total polymer (A/A+B×C/100×100), percent | 88.1 | 90.6 | 79.1 |

The control sample crystalline heteroblock copolymer had a melt index of 17 at 230° C. and a brittle temperature of 5° C. Pure polypropylene having such melt index has a brittle temperature of 35° C. Table 7 shows that the process of this invention can narrow remarkably the heteroblock copolymer size distribution range over the known process. It was found that the copolymer shows improvement in impact resistance at low temperatures, as compared with pure polypropylene. Furthermore, as is evident from Table 7, in accordance with the process of this invention, a crystalline heteroblock copolymer of propylene and butene-1 was synthesised in high yields, and in comparison with the conventional process in which the known catalyst was used, there was marked lowering of amount of by-production of commercially valueless and non-crystalline polymer and also improvement in brittle temperature by the method of this invention.

EXAMPLES 20 AND 21

A heteroblock copolymer of propylene and ethylene was synthesised by using the following titanium trichloride compositions:

Composition of Example 18 (Example 20)
Composition of Example 19 (Example 21)
and said control sample, titanium trichloride (control sample shown in Examples 18 and 19).

A 2.5-litre stirring type stainless steel autoclave was charged with 0.6 g. of each of said compositions or said titanium trichloride, 1.2 g. of di-n-propyl-aluminum monochloride and 900 ml. of heptane in an atmosphere of nitrogen. After substituting the inside of the autoclave by propylene, hydrogen was introduced until the interior pressure reached 0.3 kg./cm.$^2$. Thereafter, propylene was introduced until the inside pressure became 3 kg./cm.$^2$. The autoclave was heated from outside and while stirring, polymerisation was carried out at 70° C. The polymerisation was continued throughout at a pressure of 5 kg./cm.$^2$. When the amount of propylene fed reached 50 g., the introduction of propylene was terminated and replaced by that of ethylene. When the amount of ethylene fed reached 5 g., it was again replaced by propylene. Thereafter, 50 g. of propylene and 5 g. of ethylene were introduced one after another, and when the total amount of the fed monomers reached 495 g., 30 g. of propylene were further added and the polymerisation was stopped. (In these cases, the number of cycle was 9.5 and the number of operation of replacement was 18.)

After the termination of the polymerisation, the residual gas was discharged. After cooling, 200 ml. of methanol were added. Stirring was affected at 80° C. for one hour. The autoclave was cooled and the contents were taken out. The obtained slurry was diluted with 900 ml. of heptane and further diluted with 200 ml. of water to separate a layer of water. This procedure was repeated three times.

Then, the slurry was heated to 60° C. and filtered at 60° C. The filtered cake was washed with heptane and steamed to separate the heptane. It was thereafter dried at reduced pressure at 60° C. to give a crystalline propylene-ethylene heteroblock copolymer.

TABLE 8

|  | Example | | Control |
|---|---|---|---|
|  | 20 | 21 |  |
| Yield of heteroblock copolymer (g.): | | | |
| Crystalline (A) | 448 | 460 | 403 |
| Non-crystalline (B) | 77 | 65 | 122 |
| Ratio of crystalline copolymer (A/A+B×100), percent | 85.3 | 87.5 | 76.8 |
| Properties of crystalline heteroblock copolymer: | | | |
| Contents of ethylene (wt. percent) | 3.7 | 3.8 | 2.8 |
| Ratio of residue after extraction with n-heptane (percent) (C) | 90.5 | 91.5 | 88.4 |
| Melt-index | 7.9 | 6.2 | 8.1 |
| Brittle temperature (° C.) | −25 | −20 | −18 |
| Particle size distribution (content of particles having a size of 60–1,000μ) (percent) | 91.2 | 93.1 | 58.3 |
| Ratio of residue after extraction with n-heptane to total polymer (A/A+B×C/100×100), percent | 77.2 | 80.1 | 67.9 |

It is clear from Table 8 that in accordance with the process of this invention, the yield of the crystalline polymer was markedly improved and the brittle temperature was lowered as compared with the conventional method. Further, in the process of this invention the particle size distribution can be made much narrower than in the conventional method.

EXAMPLE 22

A 2.5-litre interior stirring type stainless steel autoclave whose interior was substituted by nitrogen was charged with 2 g. of the titanium trichloride composition described in Example 19, 3.0 g. of diethylaluminum monobromide and 1-litre of purified white kerosene in an atmosphere of nitrogen.

After substituting the interior of autoclave by propylene, hydrogen was introduced until the pressure was 0.3 kg./cm.$^2$ and propylene was further introduced until the interior pressure reached 3 kg./cm.$^2$. While stirring, the temperature was raised to 70° C. and polymerisation was started at an interior pressure of 5 kg./cm.$^2$.

When the amount of the propylene fed reached a certain value, the introduction of propylene was stopped and the gas inside the autoclave was discharged. When the interior pressure became atmospheric pressure, ethylene was introduced and polymerisation was continued at an interior pressure of 5 kg./cm.$^2$. When the amount of ethylene polymerised reached 20 mole percent based on the propylene polymerised before, the introduction of ethylene was stopped, followed by discharge of the ethylene present inside. The operation beginning from the introduction of hydrogen and ending in the discharge of ethylene was regarded as one cycle. Copolymerisation was carried out with the cycle adjusted to 1, 3 and 5. The same purification and drying procedure as in Example 21 were carried out to obtain crystalline and non-crystalline propylene-ethylene heteroblock copolymer, respectively.

In order to make comparison with these, a heteroblock copolymer of propylene-ethylene was produced in the same manner as above mentioned, using the same titanium trichloride composition (control samples described in Examples 18 and 19) except that di-n-butylether and titanium tetrachloride were not added.

The results are shown in Table 9, from which it is clear that the product in accordance with this invention is superior to the conventional product (control sample) with respect to the following.

(1) When the number of cycle was increased to 5 in the process of this invention, there is a higher yield of a crystalline copolymer than that obtained by the conventional method in which the cycle is only one.

(2) When the number of cycle is only one in the process of this invention, the product has a low brittle temperature as compared with the product obtained by the conventional process in which the number of cycle is 5.

The particle size distribution of the heteroblock copolymer obtained in accordance with the process of this invention is narrower, regardless of the cycle number, than that of the product by the conventional process.

TABLE 9

|  | Example 22 | | | Control | | |
|---|---|---|---|---|---|---|
| Number of cycle | 1 | 3 | 5 | 1 | 3 | 5 |
| Yield of heteroblock copolymer (g.): | | | | | | |
| Crystalline (A) | 491 | 478 | 467 | 456 | 444 | 421 |
| Non-crystalline (B) | 10 | 23 | 33 | 44 | 57 | 80 |
| Ratio of crystalline copolymer (A/A+B×100), percent | 98.0 | 95.4 | 93.4 | 91.2 | 88.6 | 84.0 |
| Properties of crystalline heteroblock copolymer: | | | | | | |
| Content of ethylene (wt. percent) | 14.0 | 13.0 | 11.4 | 11.0 | 9.2 | 7.0 |
| Ratio of residue after extraction of n-heptane (percent) (C) | 96.8 | 95.0 | 94.8 | 95.2 | 93.8 | 93.8 |
| Melt-index | 0.7 | 0.9 | 0.9 | 0.7 | 0.9 | 0.9 |
| Brittle temperature (° C.) | −25 | −29 | −30 | −16 | −21 | −24 |
| Particle size distribution (content of particles having a size of 60–1,000μ) (percent) | 92.6 | 91.2 | 91.2 | 58.1 | 57.1 | 57.3 |
| Ratio of residue after extraction with n-heptane to total polymer (A/A+B×C/100×100), percent | 95.0 | 90.6 | 88.5 | 86.8 | 83.1 | 78.8 |

EXAMPLE 23

Using the pulveriser of Example 18, 50 g. of titanium trichloride Grade AA manufactured by Stauffer Chemical Co. (obtained by activating Grade A article—see Example 18) and 6 g. of diphenyl ether were mixed and pulverised for 20 hours to give 55 g. of a titanium trichloride composition. The coarse particle and fine particle contents of the composition were 4.3% and 2.6%, respectively.

Copolymerisation of propylene and ethylene was carried out in accordance with the method of Example 20 using as a catalyst 0.7 g. of the said composition and 1 g. of diethylaluminum monochloride. The amount of propylene and ethylene to be fed in one cycle were, respectively, 100 g. and 4 g., and the number of cycle was changed to 4.5 (8 times of replacement). The after-treatment of the obtained copolymer was carried out in the same manner as in Example 20.

In order to make comparison with this example, the same procedure as in this example was repeated except that in place of the said composition, the same amount of titanium trichloride Grade AA manufactured by Stauffer Chemical Co. was used.

Results are shown in Table 10.

TABLE 10

|  | Example 23 | Control |
|---|---|---|
| Yield of heteroblock copolymer (g.): | | |
|   Crystalline (A) | 484 | 453 |
|   Non-crystalline (B) | 32 | 63 |
| Ratio of crystalline copolymer (A/A+B× 100), percent | 93.8 | 87.8 |
| Properties of crystalline heteroblock copolymer: | | |
|   Content of ethylene (percent) | 2.0 | 1.2 |
|   Ratio of residue after extraction of n-heptane (percent) (C) | 95.1 | 94.3 |
|   Melt-index | 7.6 | 7.6 |
|   Brittle temperature (° C.) | −14 | −8 |
|   Particle size distribution (content of particles having a size of 60–1,000μ) (percent) | 93.2 | 56.4 |
| Ratio of residue after extraction with n-heptane to the total polymer (A/A+B× C/×100), percent | 89.2 | 82.8 |

Table 10 shows that the process of this invention can attain a narrower particle size distribution and a higher yield of the crystalline polymer, as compared with the case where commercially available titanium trichloride is used.

EXAMPLE 24

1.5 g. of titanium tetrachloride and 4 g. of anisole (methylphenylether) were added to 50 g. of titanium trichloride obtained by reduction of titanium tetrachloride with hydrogen, and the mixture was pulverised in an atmosphere of nitrogen in a steel ball mill packed with a steel ball for 50 hours to give 54.5 g. of a titanium trichloride composition. The coarse particle and fine particle contents of the composition were 4.6% and 3.8%, respectively.

0.7 g. of said composition and 1.2 g. of diethylaluminum monochloride and 900 ml. of heptane were fed in an atmosphere of nitrogen into an interior stirring type stainless steel autoclave having a capacity of 2.5 liters. Copolymerisation of propylene and ethylene was carried out by the method of Example 20. The amount of propylene and ethylene to be fed in one cycle was 25 g. and 0.5 g., respectively, and the number of cycle was changed to 20 (number of operation of replacement being 39). The after-treatment of the copolymer was also carried out by the same method as in Example 20.

In order to make comparison with this example, copolymerisation and after-treatment were carried out in the same manner as in this example except that in place of said composition, there was used the same amount of titanium trichloride in the form of fine powder obtained by pulverising titanium trichloride (the same pulverising method as in the manufacture of the catalyst composition of this example except that both titanium tetrachloride and anisole were not added). The coarse particle and fine particle contents of the titanium trichloride were 12.3% and 26.3%, respectively.

Results are shown in Table 11.

TABLE 11

|  | Example 24 | Control |
|---|---|---|
| Yield of heteroblock copolymer (g.): | | |
|   Crystalline (A) | 448 | 386 |
|   Non-crystalline (B) | 63 | 124 |
| Ratio of crystalline copolymer (A/A+B× 100) percent | 87.7 | 75.7 |
| Properties of crystalline heteroblock copolymer: | | |
|   Content of ethylene (percent) | 0.7 | 0.1 |
|   Ratio of residue after extraction with n-heptane (percent) (C) | 91.2 | 88.4 |
|   Melt-index | 6.4 | 6.6 |
|   Brittle temperature (° C.) | −25 | −14 |
|   Particle size distribution (content of particles having a size of 60–1,000μ) (percent) | 92.0 | 58.8 |
| Ratio of residue after extraction with n-heptane to the total polymer (A/A+B× C/100×100) percent | 80.0 | 66.9 |

EXAMPLE 25

This example is to illustrate that ethers and ketones are particularly effective for improving the particle size distribution of the titanium trichloride composition. Experimental procedures:

Fifty grams of a titanium trichloride component of the formula $TiCl_3 \cdot \frac{1}{3} AlCl_3$ (of Stauffer Chemical Co.) obtained by the reduction of titanium tetrachloride with a metallic aluminum was charged into a 1-litre vibration mill (manufactured by Siebtechnik) in which oxygen had been sufficiently replaced by nitrogen and milled for 24 hours at a temperature of 30 to 40° C. The milled composition was passed through a 150 mesh Tyler sieve, and the particles capable of passing through the sieve were used as the titanium trichloride composition of the propylene polymerisation catalyst which will be described below. The product obtained was designated as Control (Experiment No. VII).

Six kinds of the titanium trichloride compositions were obtained according to the same procedure as above except that 0.24 g.-mol per kilogram of $TiCl_3 \cdot \frac{1}{3} AlCl_3$ of diphenyl ether (Experiment No. I), methyl isobutyl ketone (Experiment No. II), methanol (Experiment No. III), isobutanol (Experiment No. IV), benzoic acid (Experiment No. V), and paraldehyde (Experiment No. VI), respectively were added to the titanium trichloride component, followed by copulverising.

With the use of 0.55 g. of each of these seven titanium trichloride compositions and 1.2 g. of diethylaluminum monochloride, the polymerisation of propylene was carried out in a heptane solvent. The polymerisation temperature was 70° C. and the polymerisation time was as shown in the following table. According to the customary method, post-treatment was carried out. The results are shown in the table.

Results are shown in table below.

| Additive | Experiment | | | | | | |
|---|---|---|---|---|---|---|---|
| | I | II | III | IV | V | VI | VII |
| | Diphenyl ether | Methyl isobutyl ketone | Methanol | Isobutanol | benzoic acid | Para aldehyde | None (control) |
| Content (percent) of fine particles of a diameter smaller than 10µ in a titanium trichlor. decomposition treated in a vibration mill | 6.8 | 6.7 | 26.1 | 24.3 | 24.4 | 24.0 | 26.1 |
| Content (percent) of particles of a dimater of 10–105µ in a titanium trichloride composition treated in a vibration mill | 93.2 | 93.3 | 73.9 | 75.7 | 75.6 | 76.0 | 73.9 |
| Polymerisation time (hour) | 3⅔ | 3⅔ | 3⅚ | 4.0 | 3⅔ | 3½ | 3½ |
| Yield of powder (g.) | 500 | 364 | 471 | 476 | 371 | 293 | 464 |
| Yield of atactic polymer (g.) | 30 | 14 | 45 | 33 | 75 | 37 | 50 |
| Yield (percent) | 94.6 | 96.3 | 91.5 | 93.5 | 83.4 | 89.0 | 90.6 |
| Activity (g./g. hr.) | 266 | 180 | 234 | 230 | 224 | 172 | 264 |
| Isotactic index in the pollymer particle (percent) | 95.9 | 95.7 | 94.5 | 95.6 | 91.7 | 84.3 | 96.6 |
| Bulk density (g./cc.) | 0.394 | 0.384 | 0.399 | 0.401 | 0.385 | 0.394 | 0.363 |
| Content of fine particles having a diameter smaller than 60µ in the polymer particles | 6.6 | 6.0 | 18.0 | 17.2 | 18.4 | 14.2 | 18.4 |

What we claim is:

1. A catalyst composition for the homopolymerization of propylene and for the copolymerization of propylene with a different 1-olefin having 2–6 carbon atoms, which comprises a titanium trichloride component selected from the group consisting of violet crystalline titanium trichloride and violet crystalline titanium trichloride cocrystallized with aluminum trichloride, a dialkyl aluminum monohalide and an organic compound selected from the group consisting of organic monoether compounds of the formula $$R_1—O—R_2$$

wherein $R_1$ and $R_2$ are selected from alkyl and aryl groups and monoketone compounds of the formula $$R_3—CO—R_4$$

wherein $R_3$ and $R_4$ are selected from alkyl and aryl groups wherein said organic compound is present in an amount of 0.2 to 7 moles per kilogram of the said titanium trichloride component, said titanium trichloride component and said organic compound being present in the form of granular particles obtained by cotreating said titanium trichloride component and said organic compound in a ball mill or vibration mill for 20 to 50 hours to copulverize them and agglomerate the finely pulverized particles, wherein more than 80% by weight of the said granular particles consists of particles having a particle diameter ranging from 10 microns to 105 microns, said granular particles being substantially devoid of particles of a diameter less than 5 microns.

2. The catalyst composition of claim 1 wherein the treatment in a ball mill or vibration mill is carried out in an atmosphere of an inert gas at a temperature below 80° C.

3. The catalyst composition of claim 1 wherein the organic compound is said organic monoether compound.

4. The catalyst composition of claim 3 wherein the organic monoether compound is dibutylether.

5. The catalyst composition of claim 3 wherein the organic monoether compound is diphenylether.

6. The catalyst composition of claim 1 wherein the organic compound is said organic monoketone compound.

7. The catalyst composition of claim 6 wherein the organic monoketone compound is methylethyl ketone.

8. The catalyst composition of claim 6 wherein the organic monoketone compound is methylisobutyl ketone.

9. The catalyst compositions of claim 6 wherein the organic monoketone compound is methyl-n-amylketone.

10. The catalyst composition of claim 1 wherein said composition further contains 0.5 to 10% by weight, based on the said titanium trichloride component, of titanium tetrachloride.

11. A process for the homopolymerization of propylene which comprises contacting propylene in the presence of an inert solvent with the catalyst composition comprising a titanium trichloride component selected from the group consisting of violet crystalline titanium trichloride and violet crystalline titanium trichloride cocrystallized with aluminum trichloride, a dialkyl aluminum monohalide and an organic compound selected from the group consisting of organic monoether compounds of the formula $$R_1—O—R_2$$

wherein $R_1$ and $R_2$ are selected from alkyl and aryl groups, and organic monoketone compounds of the formula $$R_3—CO—R_4$$

wherein $R_3$ and $R_4$ are selected from alkyl and aryl groups, said organic compound being present in an amount of 0.2 to 7 moles per kilogram of the said titanium trichloride component, said titanium trichloride component and said organic compound being present in the form of granular particles obtained by cotreating said titanium trichloride component and said organic compound in a ball mill or vibration mill for 20 to 50 hours to copulverize them and agglomerate the finely pulverized particles, wherein more than 80% by weight of the said granular particles consists of particles having a particle diameter ranging from 10 microns to 105 microns, said granular particles being substantially devoid of particles of a diameter less than 5 microns.

12. A process for the copolymerization of propylene with a different 1-olefin having 2–6 carbon atoms, which comprises contacting the said monomers in the presence of an inert solvent with the catalyst composition comprising a titanium trichloride component selected from the group consisting of violet crystalline titanium trichloride and violet crystalline titanium trichloride cocrystallized with aluminum trichloride, a dialkyl aluminum monohalide and an organic compound selected from the group consisting of organic monoether compounds of the formula $$R_1—O—R_2$$

wherein $R_1$ and $R_2$ are selected from alkyl and aryl groups, and organic monoketone compounds of the formula $$R_3—CO—R_4$$

wherein $R_3$ and $R_4$ are selected from alkyl and aryl groups, said organic compound being present in an amount of 0.2 to 7 moles per kilogram of the said titanium trichloride component, said titanium trichloride component and said organic compound being present in the form of granular particles obtained by cotreating said titanium trichloride component and said organic compound in a ball mill or vibration mill for 20 to 50 hours to copulverize them and agglomerate the finely pulverized particles, wherein more than 80% by weight of the said granular particles consists of particles having a particle diameter ranging from 10 microns to 105 microns, said granular particles being substantially devoid of particles of a diameter less than 5 microns.

13. A process for producing a heteroblock copolymer containing at least one polypropylene block segment which comprises successively contacting propylene monomer and at least one different 1-olefin monomer having 2 to 6 carbon atoms in the presence of an inert solvent, the propylene monomer being present in an amount sufficient to provide at least 80% by weight of the heteroblock copolymer, with the catalyst composition comprising a titanium trichloride component selected from the group consisting of violet crystalline titanium trichloride and violet crystalline titanium trichloride cocrystallized with aluminum trichloride, a dialkyl aluminum monohalide and an organic compound selected from the group consisting of organic monoether compounds of the formula $$R_1-O-R_2$$

wherein $R_1$ and $R_2$ are selected from alkyl and aryl groups, and organic monoketone compounds of the formula $$R_3-CO-R_4$$

wherein $R_3$ and $R_4$ are selected from alkyl and aryl groups, said organic compound being present in an amount of 0.2 to 7 moles per kilogram of the said titanium trichloride component, said titanium trichloride component and said organic compound being present in the form of granular particles obtained by cotreating said titanium trichloride component and said organic compound in a ball mill or vibration mill for 20 to 50 hours to copulverize them and agglomerate the finely pulverized particles, wherein more than 80% by weight of the said granular particles consists of particles having a particle diameter ranging from 10 microns to 105 microns, said granular particles being substantially devoid of particles of a diameter less than 5 microns.

References Cited

UNITED STATES PATENTS

| | | | |
|---|---|---|---|
| 2,893,984 | 4/1956 | Seelbach | 260—93.7 |
| 2,968,652 | 11/1957 | Mortes | 260—93.7 |
| 3,210,332 | 5/1963 | Lyons | 260—93.7 |
| 3,318,861 | 2/1965 | Adems | 260—93.7 |
| 3,128,252 | 4/1956 | Tornquist | 252—429 |
| 3,420,809 | 12/1961 | Tornquist | 260—94.9 |
| 3,241,913 | 4/1963 | Fonler | 260—94.9 |
| 3,451,768 | 6/1969 | Luciani | 23—87 |
| 3,318,859 | 5/1967 | Adena | 260—93.7 |
| 3,256,257 | 6/1966 | Argabright | 260—88.2 |

OTHER REFERENCES

Chemical Engineers' Handbook 1950, J. H. Perry, Editor McGraw-Hill Book Co., pp. 1110–1113.

JOSEPH L. SCHOFER, Primary Examiner

R. S. BENJAMIN, Assistant Examiner

U.S. Cl. X.R.

260—88.2, 93.7; 252—429, 431